(12) United States Patent
Davison (10) Patent No.: US 8,997,061 B1
(45) Date of Patent: Mar. 31, 2015

(54) TEST SCHEDULING BASED ON HISTORICAL TEST INFORMATION

(75) Inventor: Steven John Davison, Poway, CA (US)

(73) Assignee: Teradata US, Inc., Dayton, OH (US)

( * ) Notice: Subject to any disclaimer, the term of this patent is extended or adjusted under 35 U.S.C. 154(b) by 1241 days.

(21) Appl. No.: 12/114,715

(22) Filed: May 2, 2008

Related U.S. Application Data

(60) Provisional application No. 61/018,338, filed on Dec. 31, 2007.

(51) Int. Cl.
  *G06F 9/44* (2006.01)
  *G06F 11/30* (2006.01)
(52) U.S. Cl.
  CPC ..................................... *G06F 11/30* (2013.01)
  USPC .......................................... 717/130; 717/124
(58) Field of Classification Search
  None
  See application file for complete search history.

(56) References Cited

U.S. PATENT DOCUMENTS

| | | | |
|---|---|---|---|
| 5,634,098 A * | 5/1997 | Janniro et al. | 714/38.1 |
| 7,178,063 B1 | 2/2007 | Smith | |
| 7,650,574 B2 * | 1/2010 | Nattinger | 717/125 |
| 2004/0154001 A1 * | 8/2004 | Haghighat et al. | 717/130 |
| 2006/0107121 A1 | 5/2006 | Mendrala et al. | |
| 2009/0070738 A1 * | 3/2009 | Johnson | 717/106 |

OTHER PUBLICATIONS

Rothermel, G., et al., Prioritizing test cases for regression testing, IEEE Trans. on Software Engineering, vol. 27, Iss. 10, Oct. 2001, Summary of Article, http://ieeexplore.ieee.org/Xplore, 1 p.
Xu, Z., et al., Application of fuzzy expert system in test case selection for system regression test, IEEE International Conference on Information Reuse and Integration, Aug. 2005, Summary of Article, http://ieeexplore.ieee.org/Xplore, 1 p.
Software Testing-Share Knowledge About Software, Regression Testing, Sep. 18, 2005, http://testingsoftware.blogspot.com/2005/09/regression-testing.html, 4 pp.
Gupta, R., Testing Database Applications—MTech Seminar Report, Dept. of Computer Science & Engineering, Indian Institute of Technology, Bombay, Mumbai, undated, 28 pp.
Kim, Jung-Min, et al., A History-Based Test Priorization Technique for Regression Testing in Resource Constrained Environments, Dept. of Computer Science, Univ. of Maryland, College Park, MC, undated, 11 pages.

* cited by examiner

*Primary Examiner* — Qamrun Nahar
(74) *Attorney, Agent, or Firm* — Perkins Coie LLP; Randy L. Campbell, Jr.

(57) ABSTRACT

Systems and methods are described that schedule tests based on historical test information, such as tests that validate developed or changed code. For example, the system may review the results of previously used tests, order the tests based on the results, such as based on the performance of the code during the test, and apply the tests during a testing cycle based on the order.

18 Claims, 7 Drawing Sheets

TEST SCHEDULING BASED ON HISTORICAL TEST INFORMATION

This application claims priority to U.S. Provisional Patent Application No. 61/018,338, filed on Dec. 31, 2007, the disclosure of which is hereby incorporated by reference in its entirety.

BACKGROUND

Running regression tests against code during development of software, such as software implemented into a product, enables developers to attempt to identify defects in their software in a timely fashion, in order to meet demands related to providing products to market quickly and effectively. A typical regression test provides developers with a "validation of fixes." That is, the test enables developers to check code, such as code altered or modified, against any and all possible factors that may cause errors in the code and ultimately a software product that contains the code.

Typically, a testing system farms out tests to a target product in a somewhat round robin manner. That is, these systems may run multiple tests against a product in order to identify defects in the product. At times, tests that continuously validate a product may be run over and over against the product, wasting time and resources during the product's development. These and other problems exist with respect to testing code or software products.

DETAILED DESCRIPTION

Overview

A system and method for scheduling tests, such as regression tests, used during the development of software is described. In some examples, the system reviews historical information related to tests previously run against a software product and orders future tests based on the reviewed information. For example, the system may review previous results of performed tests, such as the whether the product passed or failed the tests or the number of defects found during testing, and queue tests to be performed in an order from most errors found to least errors found.

In some examples, the system selects and orders tests based on variety of factors and/or characteristics taken from previously run occurrences of the tests. For example, the system may identify and/or retrieve information related to the results of previously run tests, the timing of the test, the duration of the test, the coverage of the test, and so on. Additionally, the system may use other information when determining how to order tests. For example, the system may dynamically review performing tests, code churn, hardware availability, hardware performance, and so on.

In some examples, the system uses both previous results of a tests and a weighing factor, such as a factor applied to the test based on when the test was performed, in order to obtain metrics for a group of tests used to then rank the tests for future or current testing. For example, the system may assign more recently performed tests (and their results) a higher weight than earlier performed tests because the recent tests may provide more accurate results than earlier tests, especially when a software product has undergone code changes and alterations between tests.

Thus, the system, in some examples, schedules and distributes tests to a test server in order to test previous problem situations earlier in a testing cycle.

Various examples are described herein. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Figure 1:
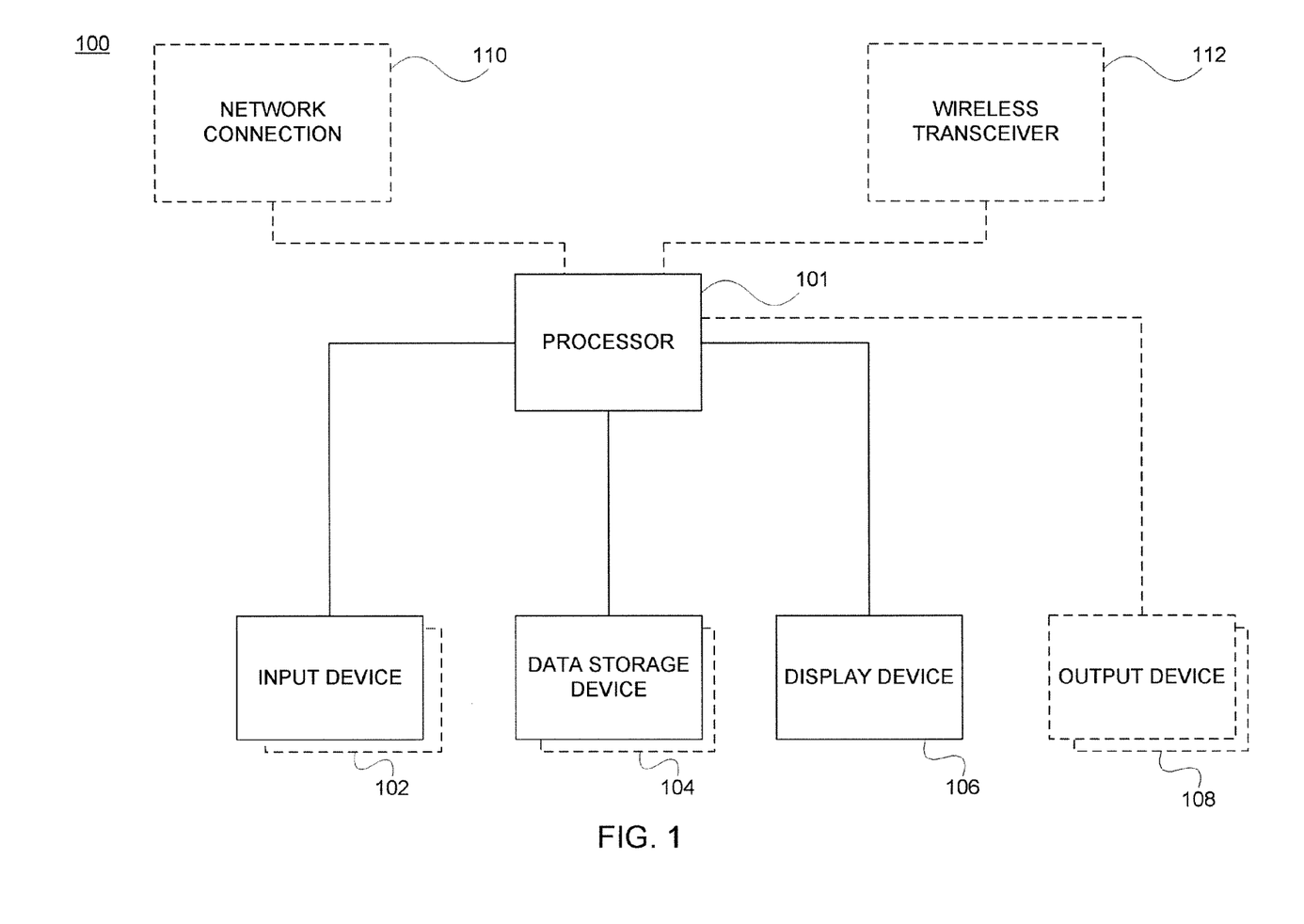
FIG. 1 is a block diagram of a basic and suitable computer that may employ aspects of the system.

FIG. 1 and the following discussion provide a brief, general description of a suitable computing environment in which aspects of the system can be implemented. Although not required, aspects and embodiments of the system will be described in the general context of computer-executable instructions, such as routines executed by a general-purpose computer, e.g., a server or personal computer. Those skilled in the relevant art will appreciate that the system can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The system can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The system can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the system described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the system may reside on a server computer, while corresponding portions reside on a client computer. Data structures and transmission of data particular to aspects of the system are also encompassed within the scope of the system.

Referring to FIG. 1, some examples of the system employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, and so on). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 1).

Aspects of the system may be practiced in a variety of other computing environments. For example, a distributed computing environment with a web interface may include one or more user computers, each of which may include a browser program module that permits the computer to access and exchange data with the Internet, including web sites within the World Wide Web portion of the Internet. The user computers may be substantially similar to the computer described above with respect to FIG. 1. User computers may include other program modules such as an operating system, one or more application programs (e.g., word processing or spread sheet applications), and the like. The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail below; the use of a web browser and web interface are only used as a familiar example here.

At least one server computer, coupled to the Internet or World Wide Web ("Web"), may perform much or all of the functions for receiving, routing and storing of electronic messages, such as web pages, audio signals, and electronic images. A private network, such as an intranet may indeed be preferred in some applications. The network may have a client-server architecture, in which a computer is dedicated to serving other client computers, or it may have other architectures such as a peer-to-peer, in which one or more computers serve simultaneously as servers and clients. A database or databases, coupled to the server computer(s), may store much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer may include a server engine, a web page management component, a content management component and a database management component. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as video, graphics and audio signals and storage of data such as textual data, video, graphics and audio signals.

In other examples, the system includes more than one server computer. A load balancing system may balance the load on the several server computers. Load balancing is a technique well-known in the art for distributing the processing load between two or more computers, to thereby more efficiently process instructions and route data. Such a load balancer can distribute message traffic, particularly during peak traffic times.

A distributed file system may couple the web servers to one or more databases. A distributed file system is a type of file system in which the file system itself manages and transparently locates pieces of information (e.g., content pages) from remote files or databases and distributed files across the network, such as a LAN. The distributed file system also manages read and write functions to the databases.

The system may distribute components of the test scheduling methods described herein across the computing architecture in a variety of ways. For example, the system may identify, schedule, and run tests using a single server, or may identify and schedule tests from components running on one server, while transmitting tests to a number of different servers to be performed in parallel.

Figure 2A:
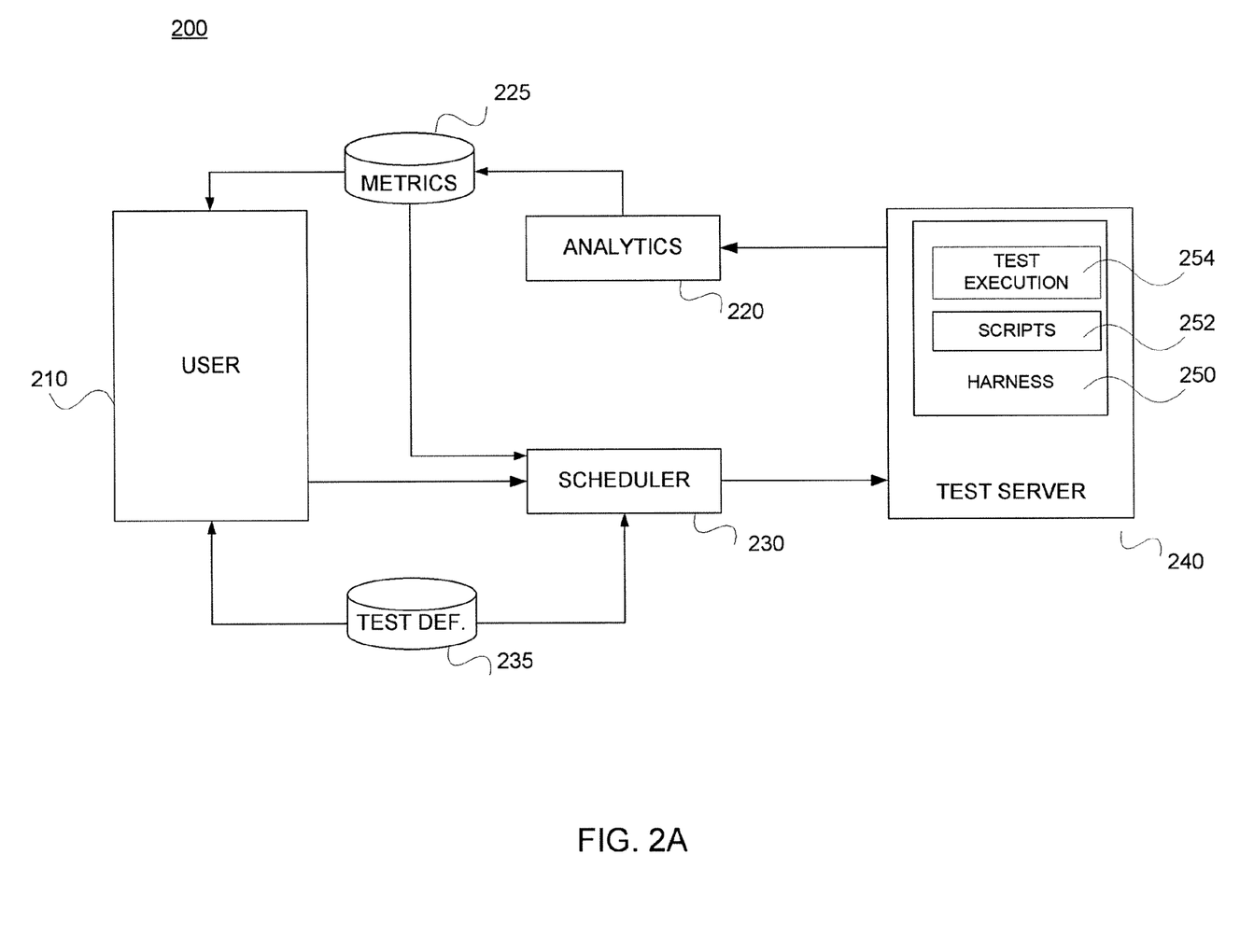
FIG. 2A is a block diagram illustrating a system for scheduling and running tests on a single test server.

Referring to FIG. 2A, a block diagram illustrating a system 200 for scheduling and running tests on a single test server is shown. For example, the system 200 may be used during unit testing, in which testing is performed to validate units of source code. These tests may be mock objects, test harnesses, and so on. The system applies these tests to individual units of code in order to isolate a part or portion of a program and show that the individual unit is coded correctly. Often described as regression tests, they enable developers to restructure previously created code and test the changed code to ensure the code is still accurate. Other benefits include simplifying the integration of code snippets and assisting in documentation.

The system 200 includes a user computer 210, such as a computer used by a software developer or administrator that identifies and schedules tests to be run against software, such as code snippets for a product under development. The user computer 210 communicates with an analytics component 220 that provides information related to performing or performed tests via a metrics database 225 that stores various metrics, historical information, dynamic information and so on. Additionally, the user computer 210 communicates with a scheduler component 230 that schedules tests to be performed against a code snippet or unit, either directly or via a test definitions database 235 that stores tests and scripts to be applied to the code unit.

The scheduler component 230 schedules and transmits tests to a test server 240 that applies received tests against target code units. The test server may include a test harness 250 that contains a database to store test scripts 252 and a test execution engine 254 that performs the tests against the code units. The test harness 250 is an automated test framework, or collection of software, configured to test code units in order to monitor the behavior of the code unit under various conditions. In some cases, the test server 240 may employ mock objects and/or other testing components when testing code units. For example, the system may use mock objects to simulate how real objects react to the code unit and to monitor the performance of the code unit.

The scheduler component 230 may use information, such as historical information, received from the user computer 210 and/or the metrics database 225 to schedule when tests are to be applied to a code unit. For example, the scheduler component 230 may place tests in a queue based on this information, and transmit the tests from the queue to the test server 240. The system may order the tests in the queue based on historical data or information related to the tests, such as test results that reflect whether the tests previously validated the code unit or found errors in the code unit.

The analytics component 220 may receive information about performed or performing tests from the test server 240, such as results information, parse the information into metrics, and store the information into a database, such as the metrics database 225. The analytics component 220 may create or update data structures stored in the metrics database 225, such as tables and indices that relate tests to various weighing factors that assist in ordering the tests before they are applied to a code unit.

Figure 2B:
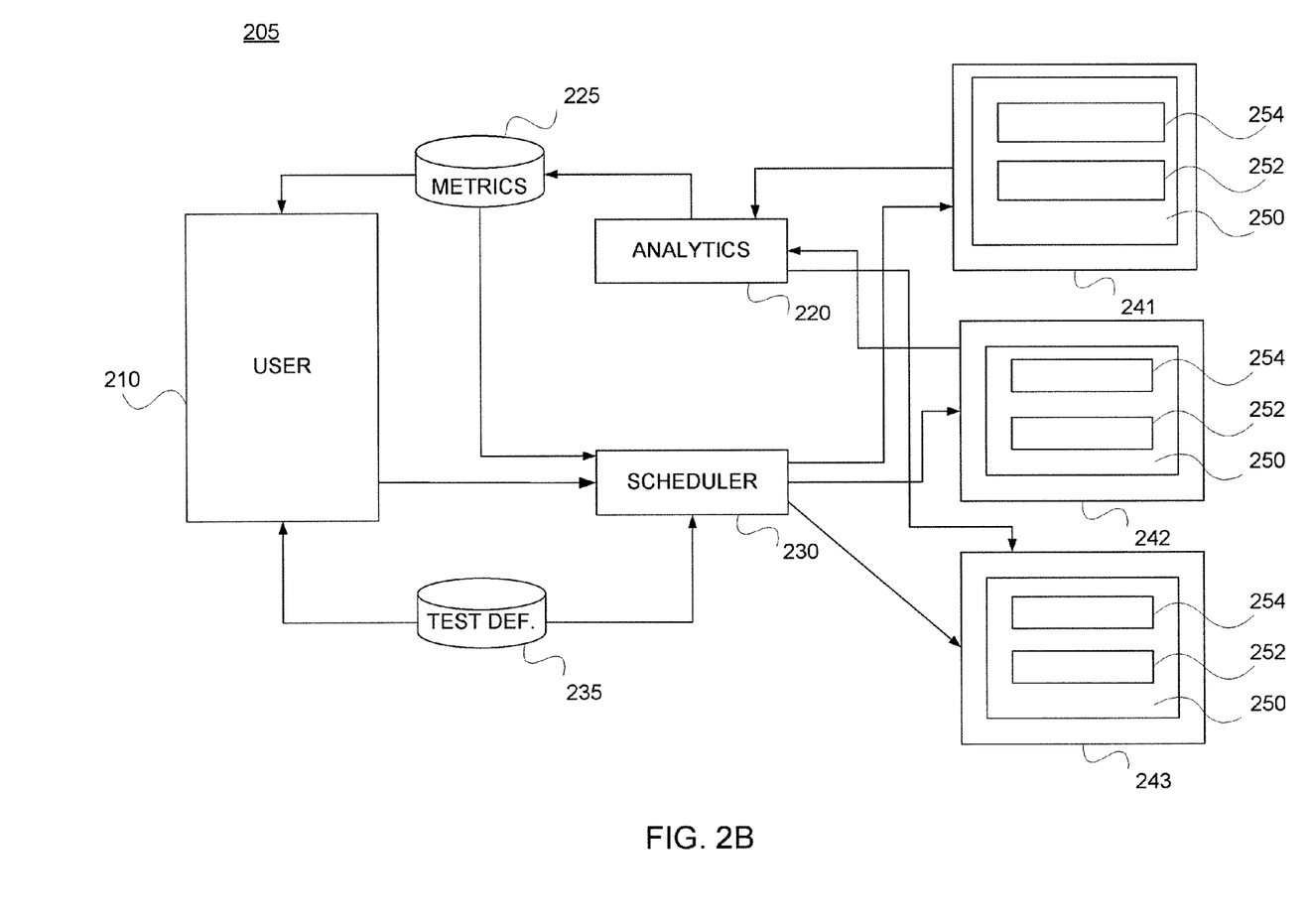
FIG. 2B is a block diagram illustrating a system for scheduling and running tests on multiple test servers.

FIG. 2B is a block diagram illustrating a system 205 for scheduling and running tests on multiple test servers. System 205 is similar to the system of FIG. 2A, except that the system 205 uses multiple test servers 241, 242, 243 when running tests against code units. For example, the scheduler component 230 may transmit a next scheduled test to one of the multiple servers 241, 242, 243 based on availability of the server or based on dynamically changing factors (e.g., factors that assist in optimizing the performance of the testing system 205).

One skilled in the art will appreciate that aspects and components of the system may be distributed across many different devices of system 200 and/or system 205. Additionally, the system 205 may employ many servers, and is not limited by the number of servers shown in the Figure.

Scheduling Tests

Figure 3:
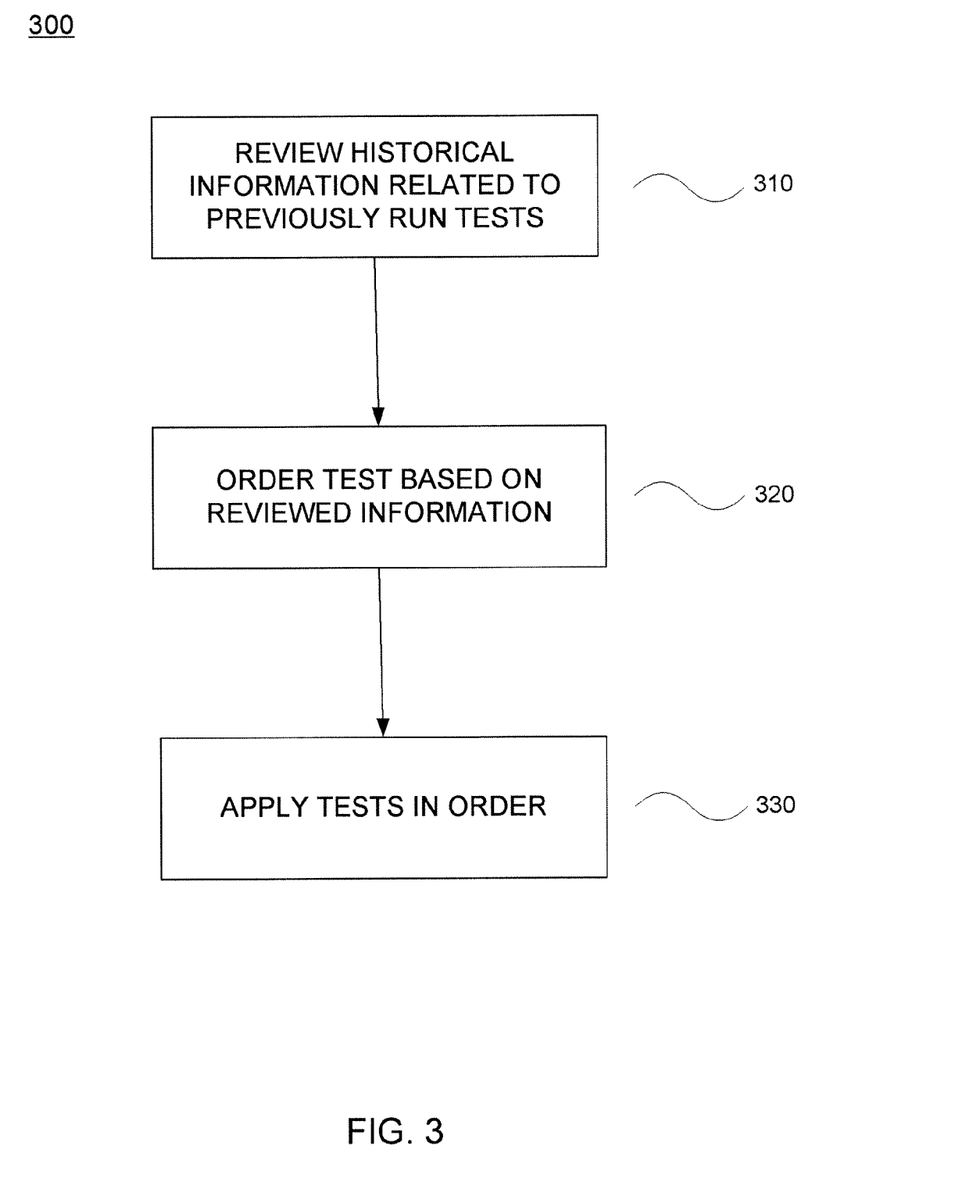
FIG. 3 is a flow diagram illustrating a routine for testing code units.

As described herein, in some examples the system uses historical performance information to determine an order for testing a code unit, such as a code unit for a software product. Referring to FIG. 3, a flow diagram illustrating a routine 300 for testing code units is shown. In step 310, the system reviews historical information related to previously run tests. For example, the system may review information related to two or more tests previously applied to the code unit. In some cases, the information indicates the performance of the previously run tests, such as whether the code unit passed or failed the test (i.e., whether the test validated the code unit) or the number of errors found during a respective test. In some cases, the information includes information identifying when the test was taken, such as at a certain time or day, during a certain iteration of the code unit, and so on. The information may also include user-defined information, test duration, test coverage, code churn due to or affected by the test, and so on.

In step 320, the system orders the tests based on the reviewed information. For example, the system places tests into a queue based on the number of errors found in previous iterations of the tests. The system may order all tests scheduled to be performed, or may order a subset of scheduled tests. The system may consider one or many factors when ordering the tests. For example, the system may schedule all tests that previously failed before the tests that passed, and then order the failed tests based on test duration.

In step 330, the system applies the tests to a code unit in the determined order. The tests may be sent in order to one test server, or may be sent to many different test servers in a similar order.

For example, the system receives a request (such as via a user terminal that receives input into the system) from a developer to test a recently changed code snippet by applying three tests (T1, T2, and T3) to the snippet of code. After receiving the request, the system reviews historical information about tests previously applied to the code snippet. The system reviews a table that relates a listing of tests with information about the tests. In this example, the system identifies the results of tests T1, T2, and T3 during the last testing cycle, one week prior to the request. The review provides the following information: T1 identified 7 errors, T2 identified 0 errors, and T3 identified 12 errors. Based on the information, the system orders the tests to be performed. T3 is placed first, T1 second, and T3 last. The system then sends the tests in the determined order to a test harness running on a test server, which applies the tests to the code snippet within the test harness.

Figure 4:
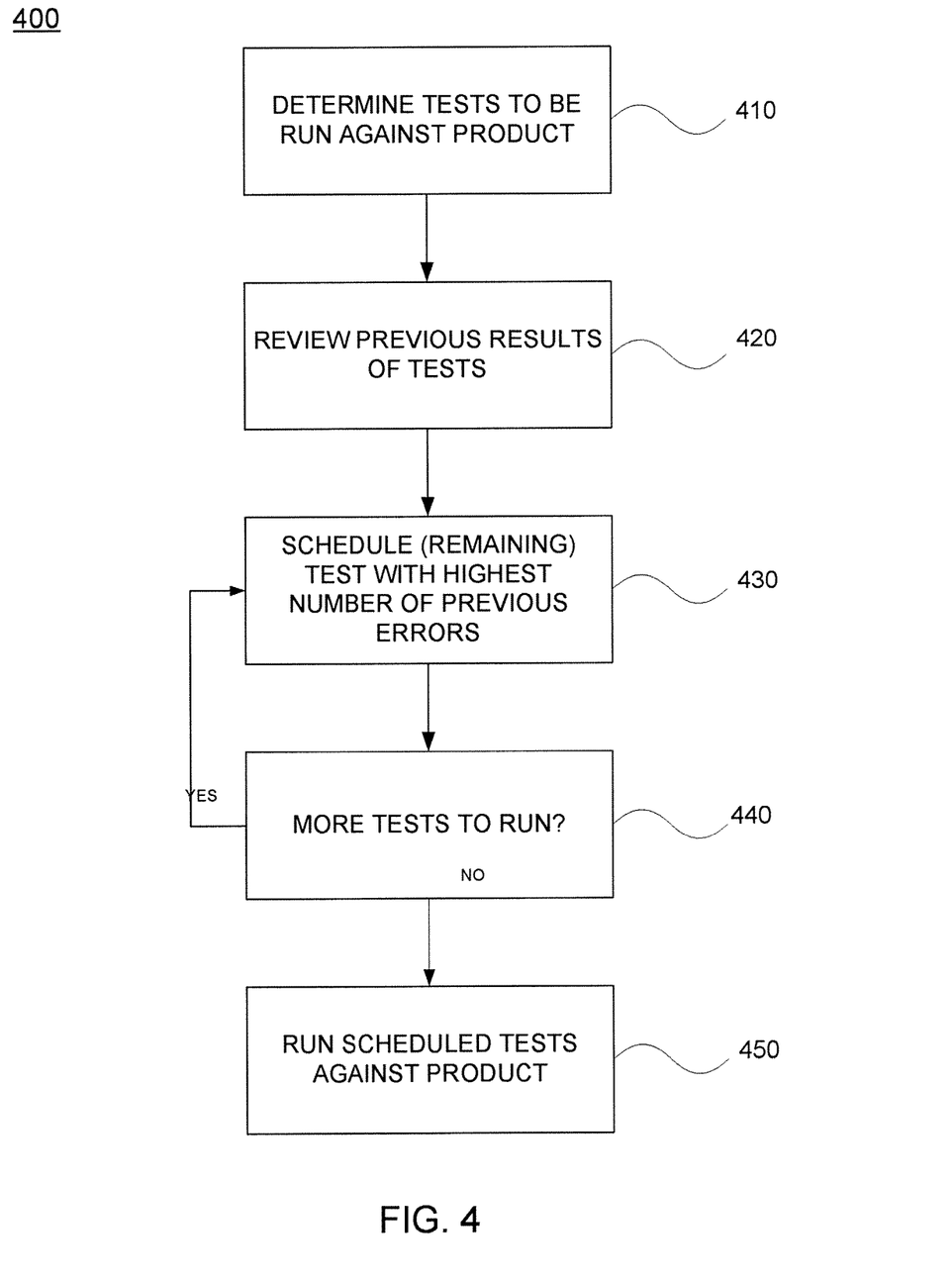
FIG. 4 is a flow diagram illustrating a routine for scheduling tests to run against a code unit.

In some examples, the system uses performance data about previously performed tests when ordering tests. Referring to FIG. 4, a flow diagram illustrating a routine for scheduling tests to run against a code unit is shown. In step 410, the system determines what tests should be run against a product, such as a code snippet associated with the product. In step 420, the system reviews previous results of the determined tests. In some cases, the system identifies a qualitative result, such as the test achieving a "pass" or "fail" result. In some cases, the system identifies a quantitative result, such as identifying the number of errors, defects, or bugs in a code snippet. For example, the test identifies 4 occurrences in the code snippet that did not perform correctly and represents such identification as a result of "4 errors."

In step 430, the system schedules a test (or one of a group of remaining tests) that previously caused the highest number of errors. In some cases, the system may directly compare the results of the tests. For example, the system may compare the number of errors found by each test, and schedule the test that found the most errors. In some cases, the system may compare the results of the tests with respect to the type of test. For example, the system may compare a ratio of the number of errors versus the duration of the test, or a number of errors versus the code churn during the test, and schedule the test that returned the highest ratio. In some cases, the system may compare incremental changes in results of tests, and schedule the test with the largest number of incremental changes.

In step 440, the system checks if additional tests are to be scheduled and ran. If there are no more tests to be scheduled, routine 400 proceeds to step 450, and the system runs the scheduled tests in the determined order. In some cases, the system may perform a test when it is scheduled. In some cases, the system may schedule all tests, and then perform the tests in the other scheduled.

Referring back to step 440, if the system determines that there are more tests to be determined, routine 400 proceeds back to step 430, and schedules the remaining test with the highest number of errors. Routine 400 proceeds until all tests have been scheduled.

Figure 5:
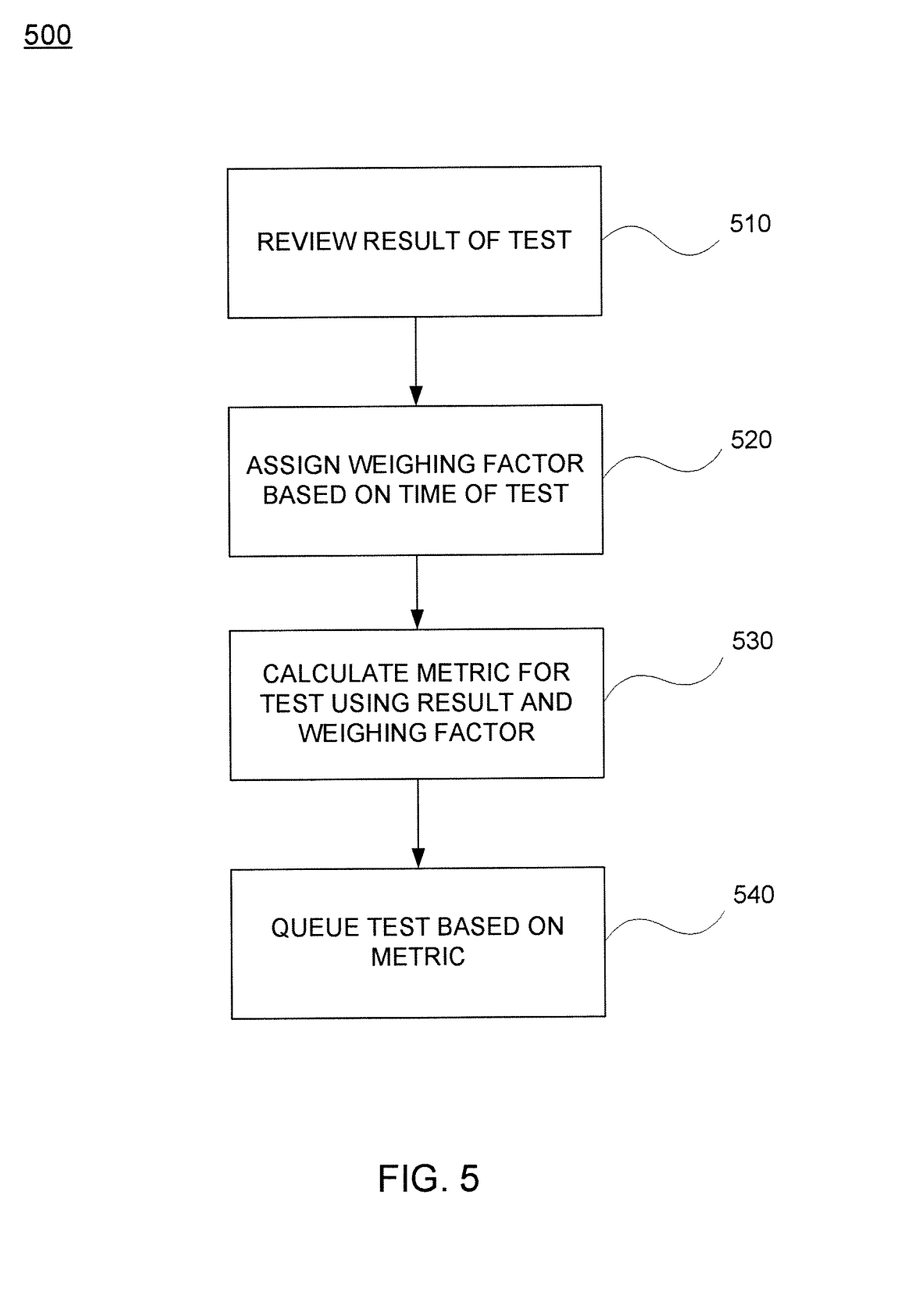
FIG. 5 is a flow diagram illustrating a routine for ordering a queue of tests to be run against a code unit.

In some examples, the system may apply weighing factors based on age or other factors to tests, such as tests that have been performed on multiple occasions, and orders the tests based on metrics calculated in part by the weighing factors. Referring to FIG. 5, a flow diagram illustrating a routine 500 for ordering a queue of tests to be run against a code unit is shown. In step 510, the system reviews the results of tests performed on a code unit. For example, the system identifies and extracts the following information for a test to be performed on April 15th:

| Test | Run | Number of Errors |
|------|----------|------------------|
| T1 | April 1 | 0 |
| T2 | April 1 | 5 |
| T3 | April 1 | 1 |
| T1 | March 15 | 1 |
| T2 | March 15 | 0 |
| T3 | March 15 | 11 |
| T1 | March 1 | 20 |
| T2 | March 1 | 5 |
| T3 | March 1 | 6 |

In step 520, the system assigns a weighing factor based on the age of the test. For example, the system considers recent tests (April 1 tests) to be the most important, and assigns them a relative weight of 5. The system then assigns a factor of 3 to the March 15 tests, and a factor of 1 to the March 1 tests.

In step 530, the system calculates an overall error metric for each test using the weighing factor and number of errors for each performance of the test (factor*number of errors). Following the example, the system calculates an error metric for T1 to be 23 (that is, 5*0+3*1+1*20), an error metric for T2 to be 30 (that is, 5*5+3*0+1*5), and an error metric for T3 to be 44 (that is, 5*1+3*11+1*6). Thus, the error metrics for the three tests are summarized as follows:

T1 has an error metric of 23
T2 has an error metric of 30
T3 has an error metric of 44.

In step 540, the system queues the tests based on highest value for the error metric. Following the example, the system queues the T3 test first, the T2 test second and the T1 test last. Of course, the system may assign different weighing factors based on age, or may assign more than one weighing factor in order to consider more than one factor when ordering tests. The system may consider a number of different weighing factors and a variety of different information, and thus perform more advanced regression testing, in order to resolve problems as early in a testing cycle as possible.

In some cases, the system may review dynamically changing performance information when scheduling tests to be performed. The information may be related to the type of tests to be performed, the performance of hardware components performing the tests, or other information. For example, in order to meet delivery timing demands for products, a developer may assign certain time periods in which to complete development tasks, such as time periods for testing developed or changed code. Thus, in addition to identifying problems early in a testing cycle, the developer may also wish to optimize when tests are performed in order to meet certain time demands should testing not identify problems at an early or timely stage within a testing cycle.

Figure 6:
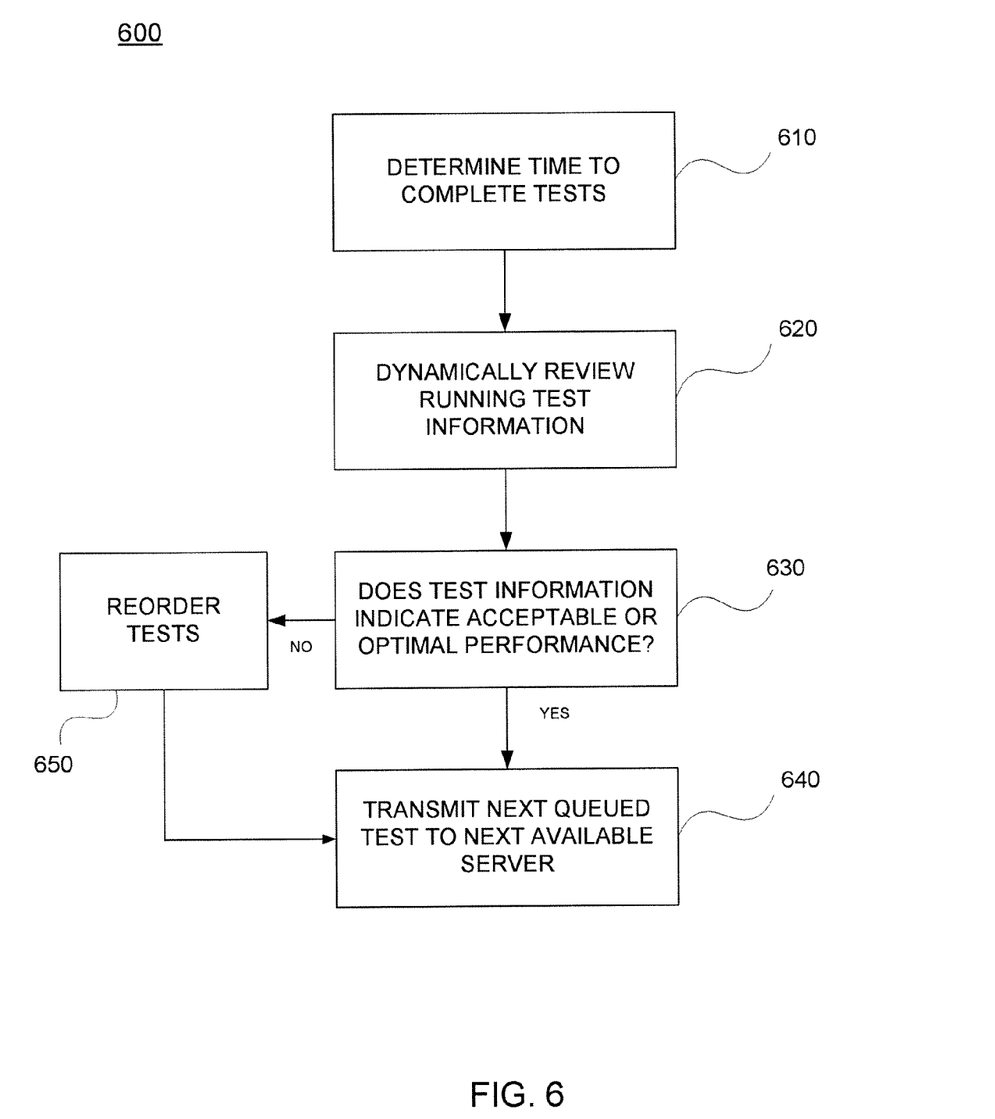
FIG. 6 is a flow diagram illustrating a routine for dynamically adjusting a queue of tests to be run against a code unit.

Referring to FIG. 6, a flow diagram illustrating a routine 600 for dynamically adjusting a queue of tests to be run against a code unit is shown. In step 610, the system determines a time in which to complete tests. The system may review information that tracks how long scheduled tests will take to run, such as identifying how long similar tests ran against similar code snippets.

In step 620, the system reviews information related to running tests, such as during the performance of one or more tests on the code snippet. For example, the system may review information related to the elapsed time of the tests, the performance of hardware components executing the tests, early results in the tests, and so on. In step 630, the system determines if the reviewed information indicates an optimal or acceptable performance of a test cycle. In some cases, the system may determine if the information indicates whether all scheduled tests will complete within an allotted time. In some cases, the system determines if the information indicates whether hardware resources are performing correctly.

If the information indicates an optimal or acceptable performance, routine 600 proceeds to step 640, and the system transmits the next scheduled test to a test server for performance (or, to the next available test server when multiple test servers are employed by the system). If the information does not indicate an optimal or acceptable performance, the system proceeds to step 650 and reorders the scheduled tests in order to achieve acceptable or optimal performance. Once reordered, the system, at step 640, transmits the next scheduled test to the test servers.

For example, there are four tests to be run against a snippet of code on two servers, a slow server and a fast server. Using the system described herein, the four tests have been ordered based on previous results against the code snippet, as such:
 1. Test beta
 2. Test alpha
 3. Test gamma
 4. Test delta Once the test cycle begins, the system transmits test beta to the slow server and the test alpha to the fast server, queuing up the test gamma and test delta to be performed once there is an available server. After certain duration, the fast server completes the test alpha, and is available to receive the next queued test, test gamma. However, the system reviews the performance information of the two servers and determines that sending test gamma to the fast server will cause the overall test cycle to require an additional two hours (because the test gamma is the shorter test of the two, and it would be faster to use the fast server to run test delta). Thus, the system reorders the remaining tests, and sends test delta to the fast server. Then, once the slow server completes test beta, the system transmits test gamma to the slow server.

The systems and methods described herein enable software developers to schedule tests in order to detect errors in code units earlier in testing cycles. They provide intelligent ordering and scheduling of tests based on historical statistics, data, and other information. Additionally, the system facilitates the aggregation of data for tests run multiple times by applying weighing factors to iterations of tests based on various criteria.

CONCLUSION

The system described herein may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The system described herein may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. While the description provided herein is made with reference to SQL and non-ANSI SQL statements and databases, the systems and methods described herein could be used with any other form of database for storing data on devices.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims. While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

I claim:

1. A method in a computing system for selecting a test to run on a portion of code, the method comprising:
   receiving a request to run a test against a portion of code;
   identifying two or more tests previously run against the portion of code, wherein the previously-run two or more tests are run to detect zero or more errors in the portion of code, and wherein results of each of the previously-run two or more tests indicate a respective number of detected errors for each of the previously-run two or more tests in the portion of code; and
   selecting one of the previously-run two or more tests to run against the portion of code based on the results of each of the previously-run two or more tests.

2. The method of claim 1, wherein selecting one of the previously-run two or more tests includes selecting the previously-run test with respective results indicating the most detected errors in the portion of code during the previous run of tests.

3. The method of claim 1, further comprising:
   placing the selected test into a queue of tests to run against the portion of code, wherein the queue of tests is ordered based on the results of the previously-run tests.

4. The method of claim 1, further comprising:
   running the selected test against the portion of code, wherein the selected test returns a result related to errors in the portion of code; and
   updating information related to respective results of the previously run tests to include the ran selected test and the returned result.

5. A system for scheduling tests to be performed against a software product, comprising:
   a memory device;
   at least one processor;
   a test harness component executable by the at least one processor, wherein the test harness component stores two or more tests to be performed against a software product and executes the stored tests against the software product;
   a metric component executable by the at least one processor, wherein the metric component receives, from the test harness component, results obtained from two or more tests during a previous performance of the two or more tests against the software product and stores the results, and wherein the results of each of the previously-run two or more tests indicate the respective number of detected errors in the portion of code; and
   a scheduling component executable by the at least one processor, wherein the scheduling component places the two or more tests in an order of execution based on the results stored in the metric component.

6. A method of ordering tests to be applied to a snippet of code, the method comprising:
   identifying two or more tests that perform a regression against the snippet of code, wherein the two or more tests have been previously performed on two separate occasions against the snippet of code;

associating a metric to each test of the two or more tests, wherein the associated metric includes a parameter based on results from each test that includes a number of errors found during a performed occasion of the test and a parameter based on an age of performed occasion of the test; and placing the two or more tests into an order based on the associated metrics.

7. The method of claim 6, wherein placing the two or more tests in an order includes placing the two or more tests in an order from highest associated metric to lowest associated metric.

8. The method of claim 6, wherein the parameter based on the results from each test includes a count of errors identified during the performed occasion.

9. The method of claim 6, wherein the parameter based on the results from each test includes a ratio of a count of errors identified during the performed occasion over a size of code covered during the performed occasion.

10. The method of claim 6, wherein the metric includes a parameter that assigns a higher weight to tests performed more recently than other tests.

11. The method of claim 6, further comprising:
running the tests against the snippet of code in the placed order.

12. A computer-readable storage device encoded with computer-executable instructions executable with a processor, the computer-readable storage device comprising:
instructions to review results for previous performances of the tests against the unit of code;
instructions to identify at least one metric associated with each test;
instructions to identify the tests that indicate a result associated with a failure of validation of the unit of code; and
instructions to schedule the identified tests to be performed against the unit of code before non-identified tests based on the result indicated by each of the identified tests and the at least one metric associated with each of the identified tests wherein the result of each of the identified tests indicate a respective number of detected errors in the unit of code for each of the identified tests.

13. The computer-readable storage device of claim 12, further comprising instructions to order the scheduled identified tests from a highest number of detected errors to a lowest number of detected errors.

14. The computer-readable storage device of claim 12, further comprising instructions to perform the identified tests against the unit of code according to the schedule.

15. The computer-readable storage device of claim 12, wherein the at least one metric includes information related to a duration of a respective previous performance of a test.

16. The computer-readable storage device of claim 12, wherein the at least one metric includes information related to code churn during the a respective previous performance of a test.

17. The computer-readable storage device of claim 12, wherein the at least one metric includes information related to an amount of code covered during a respective previous performance of a test.

18. The computer-readable storage device of claim 12, wherein the at least one metric includes information related to an age of each test.

* * * * *